(12) United States Patent
Wulff et al.

(10) Patent No.: US 10,749,768 B2
(45) Date of Patent: Aug. 18, 2020

(54) USING A MULTI-NETWORK DATASET TO OVERCOME ANOMALY DETECTION COLD STARTS

(71) Applicant: Cisco Technology, Inc., San Jose, CA (US)

(72) Inventors: Sharon Shoshana Wulff, Zurich (CH); Jean-Philippe Vasseur, Saint Martin D'uriage (FR); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/178,679

(22) Filed: Nov. 2, 2018

(65) Prior Publication Data

US 2020/0145304 A1    May 7, 2020

(51) Int. Cl.
*H04L 12/26* (2006.01)
*H04L 29/08* (2006.01)
*G06K 9/62* (2006.01)
*G06N 20/00* (2019.01)

(52) U.S. Cl.
CPC .......... *H04L 43/045* (2013.01); *G06K 9/6267* (2013.01); *G06N 20/00* (2019.01); *H04L 67/22* (2013.01); *H04L 67/322* (2013.01)

(58) Field of Classification Search
CPC ..... H04L 43/045; H04L 67/22; H04L 67/322; G06N 20/00; G06K 9/6267
See application file for complete search history.

(56) References Cited

U.S. PATENT DOCUMENTS

| | | | |
|---|---|---|---|
| 6,684,247 B1 * | 1/2004 | Santos | H04L 41/147 703/2 |
| 8,611,228 B2 * | 12/2013 | Matsunaga | H04L 1/0019 370/242 |
| 9,413,779 B2 | 8/2016 | Vasseur et al. | |
| 9,628,500 B1 | 4/2017 | Kesin et al. | |
| 9,838,409 B2 | 12/2017 | Flacher et al. | |
| 2015/0355957 A1 | 12/2015 | Steiner et al. | |
| 2016/0337175 A1 * | 11/2016 | Rao | H04L 67/20 |
| 2017/0279834 A1 | 9/2017 | Vasseur et al. | |
| 2019/0108115 A1 * | 4/2019 | Gonen | G06F 11/3495 |

\* cited by examiner

*Primary Examiner* — Azizul Choudhury
(74) *Attorney, Agent, or Firm* — Behmke Innovation Group LLC; Kenneth J. Heywood; Jonathon P. Western

(57) ABSTRACT

In one embodiment, a network assurance service receives a first set of telemetry data captured in a first network monitored by the network assurance service. The network assurance service computes, for each of a plurality of other networks monitored by the service, a similarity score between the first set of telemetry data and a set of telemetry data captured in that other network. The service selects a machine learning-based anomaly detector trained using a particular one of the sets of telemetry data captured in one of the plurality of other networks, based on the computed similarity score between the first set of telemetry data and the particular set of telemetry data captured in one of the plurality of other networks. The service uses the selected anomaly detector to assess telemetry data from the first network, until the service has received a threshold amount of telemetry data for the first network.

17 Claims, 10 Drawing Sheets

DATASETS SIMILARITY VIA CLASSIFICATION ERROR
(SMALLER VALUES MEANS MORE SIMILAR)

| | N1 | N2 | N3 | N4 | N5 | N6 | N7 | N8 |
|---|---|---|---|---|---|---|---|---|
| N8 | 0.90 +/- 0.05 | 0.87 +/- 0.04 | 0.88 +/- 0.07 | 0.92 +/- 0.04 | 0.95 +/- 0.03 | 0.96 +/- 0.04 | 0.92 +/- 0.03 | 0.50 +/- 0.00 |
| N7 | 0.87 +/- 0.02 | 0.84 +/- 0.02 | 0.87 +/- 0.04 | 0.81 +/- 0.03 | 0.86 +/- 0.04 | 0.86 +/- 0.08 | 0.50 +/- 0.00 | 0.92 +/- 0.03 |
| N6 | 0.95 +/- 0.02 | 0.92 +/- 0.04 | 0.90 +/- 0.02 | 0.88 +/- 0.03 | 0.81 +/- 0.14 | 0.50 +/- 0.00 | 0.86 +/- 0.08 | 0.96 +/- 0.04 |
| N5 | 0.94 +/- 0.03 | 0.88 +/- 0.04 | 0.94 +/- 0.03 | 0.94 +/- 0.02 | 0.50 +/- 0.00 | 0.81 +/- 0.14 | 0.86 +/- 0.04 | 0.95 +/- 0.03 |
| N4 | 0.82 +/- 0.06 | 0.90 +/- 0.03 | 0.72 +/- 0.05 | 0.50 +/- 0.00 | 0.94 +/- 0.02 | 0.88 +/- 0.03 | 0.82 +/- 0.03 | 0.93 +/- 0.04 |
| N3 | 0.85 +/- 0.03 | 0.82 +/- 0.03 | 0.50 +/- 0.00 | 0.72 +/- 0.05 | 0.94 +/- 0.03 | 0.90 +/- 0.02 | 0.87 +/- 0.04 | 0.88 +/- 0.07 |
| N2 | 0.82 +/- 0.07 | 0.50 +/- 0.00 | 0.82 +/- 0.03 | 0.90 +/- 0.04 | 0.88 +/- 0.04 | 0.92 +/- 0.04 | 0.84 +/- 0.02 | 0.87 +/- 0.05 |
| N1 | 0.50 +/- 0.00 | 0.82 +/- 0.07 | 0.85 +/- 0.03 | 0.82 +/- 0.06 | 0.94 +/- 0.03 | 0.95 +/- 0.02 | 0.87 +/- 0.02 | 0.90 +/- 0.05 |

FIG. 6

USING A MULTI-NETWORK DATASET TO OVERCOME ANOMALY DETECTION COLD STARTS

TECHNICAL FIELD

The present disclosure relates generally to computer networks, and, more particularly, to using a multi-network dataset to overcome anomaly detection cold starts.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 6 illustrates an example matrix of dataset similarities;

DESCRIPTION OF EXAMPLE EMBODIMENTS

Overview

Figure 1A:
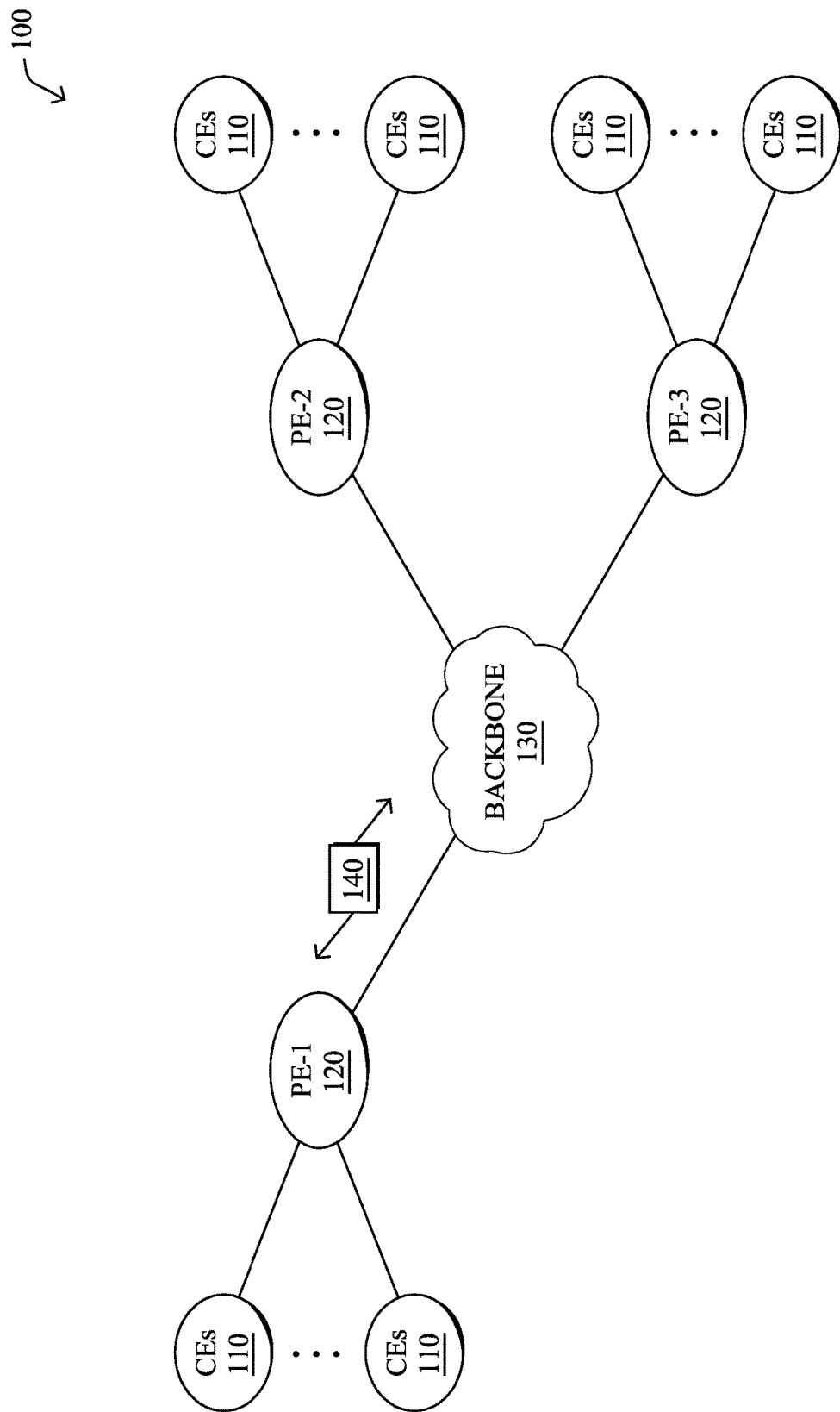
FIGS. 1A-1B illustrate an example communication network.

According to one or more embodiments of the disclosure, a network assurance service receives a first set of telemetry data captured in a first network monitored by the network assurance service. The network assurance service computes, for each of a plurality of other networks monitored by the service, a similarity score between the first set of telemetry data and a set of telemetry data captured in that other network. The service selects a machine learning-based anomaly detector trained using a particular one of the sets of telemetry data captured in one of the plurality of other networks, based on the computed similarity score between the first set of telemetry data and the particular set of telemetry data captured in one of the plurality of other networks. The service uses the selected anomaly detector to assess telemetry data from the first network, until the service has received a threshold amount of telemetry data for the first network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
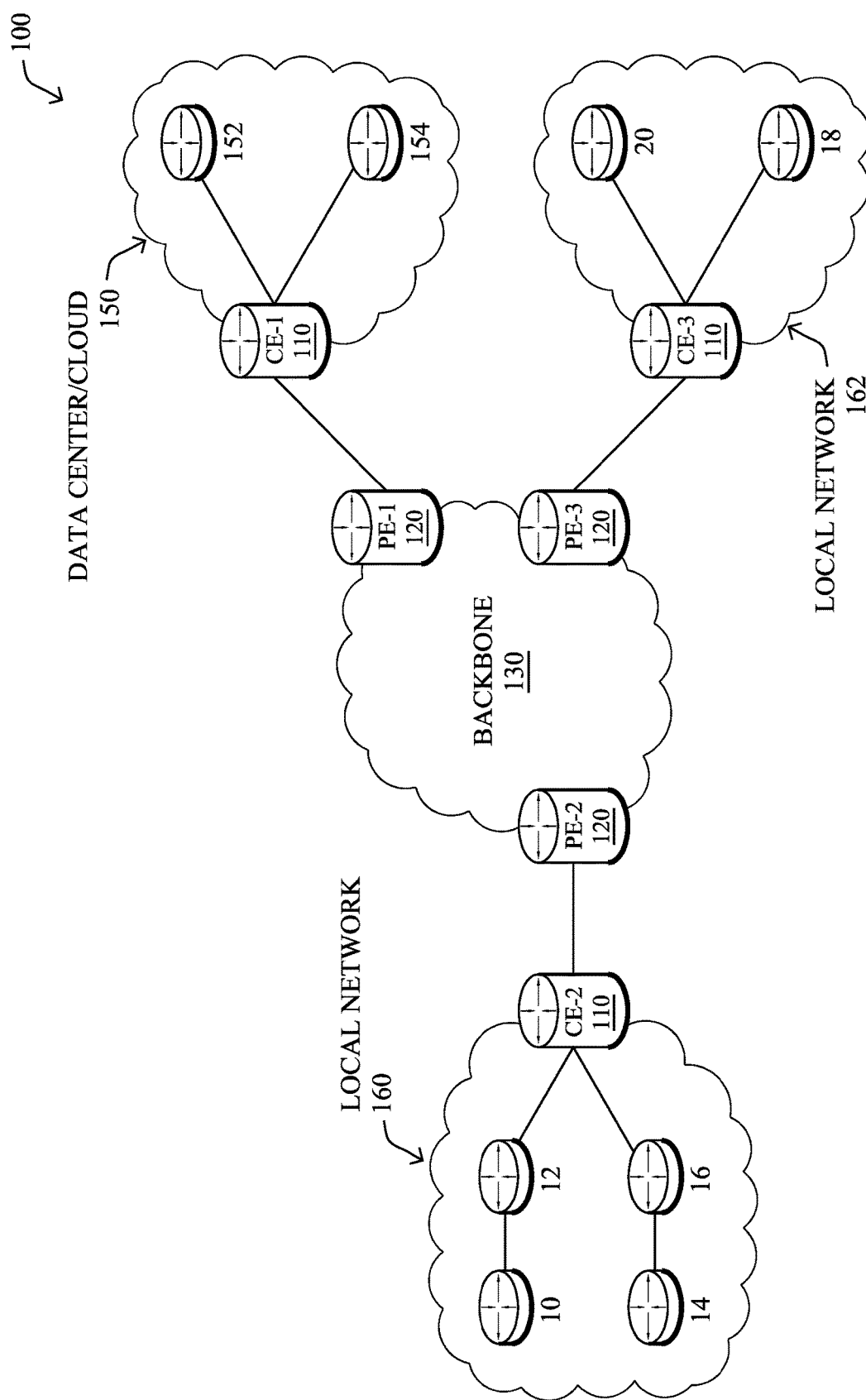

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
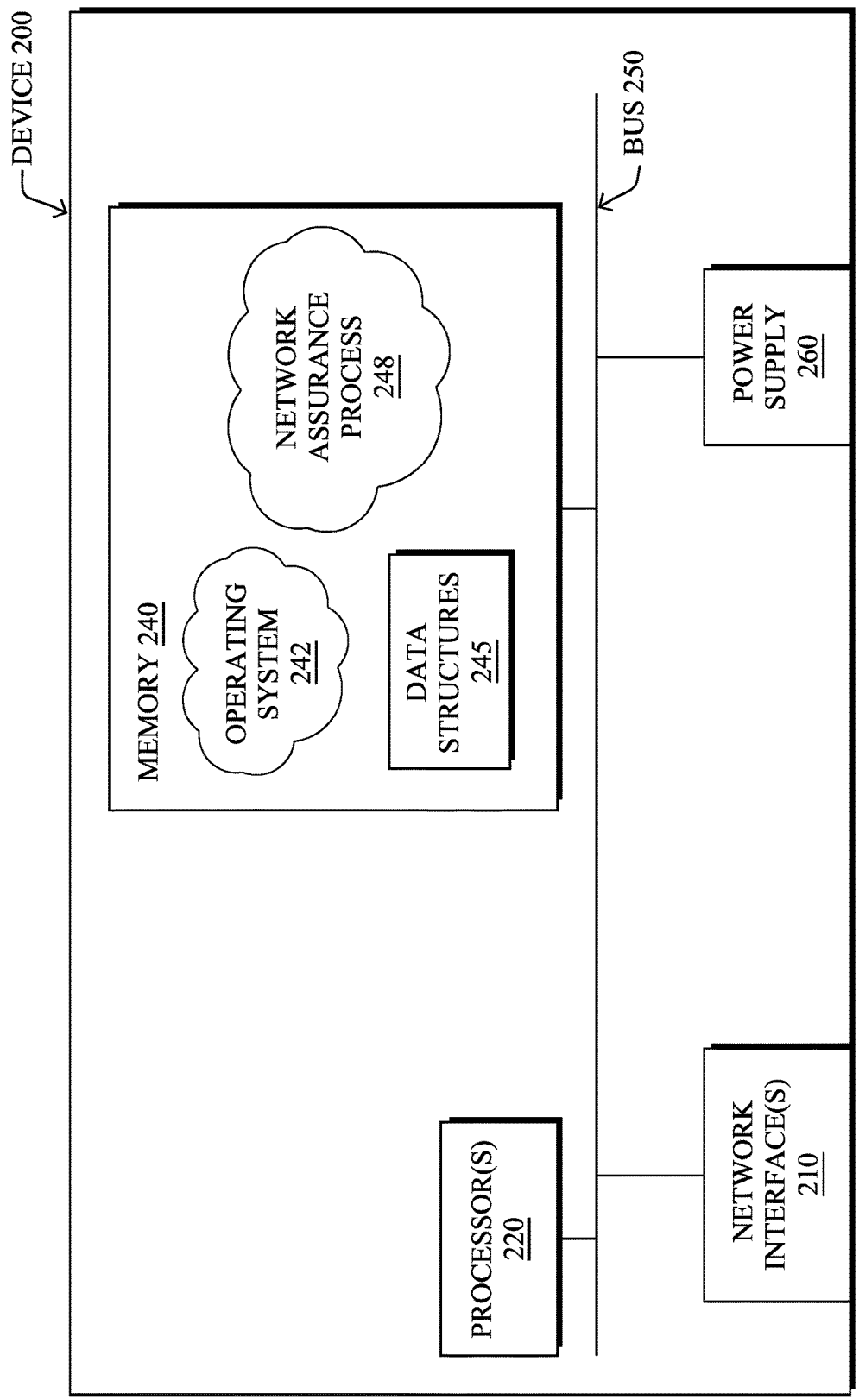
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
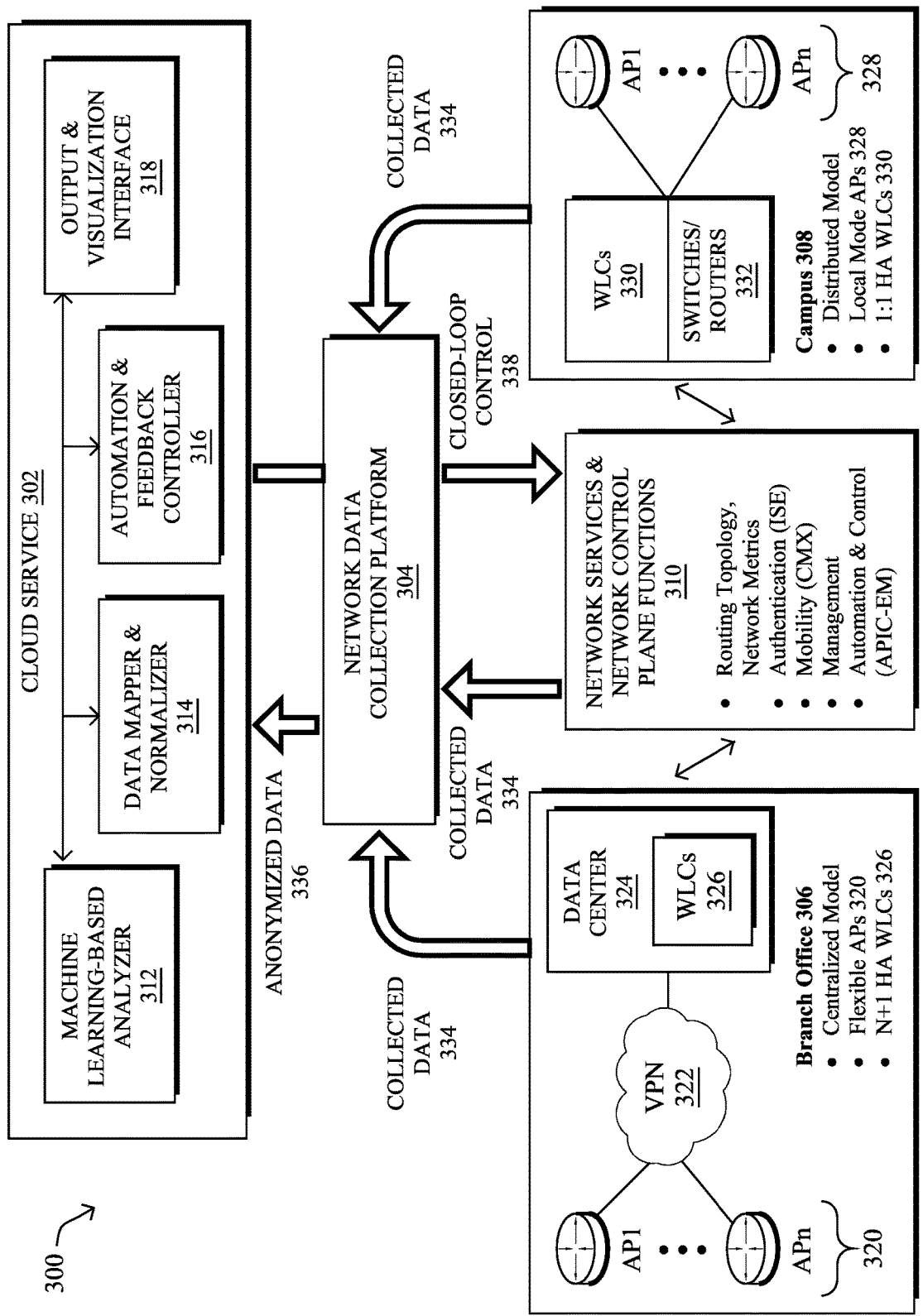
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point API through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point API through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, the network assurance service, such as service 302, may leverage machine learning-based anomaly detection, to identify abnormal behaviors in a network monitored by the service. In order to train the underlying model of an anomaly detector, the service first needs a training dataset of collected telemetry data from the network under scrutiny. The training dataset also needs to be of sufficient size (e.g., over a suitable data collection period), in order to properly "learn" the normal behaviors of the network.

The need for a suitable training dataset presents a considerable challenge when the network assurance service begins monitoring a new network (e.g., a new customer begins using the service). Such a situation represents a "cold start" scenario whereby the service first has to learn the baseline behavior of the new network before it can begin flagging anomalous behaviors. In addition, simply applying a pre-existing anomaly detector trained using data from another network to the new network may also lead to poor performance, as what is 'normal' in one network may be highly anomalous in the other network.

Figure 4A:
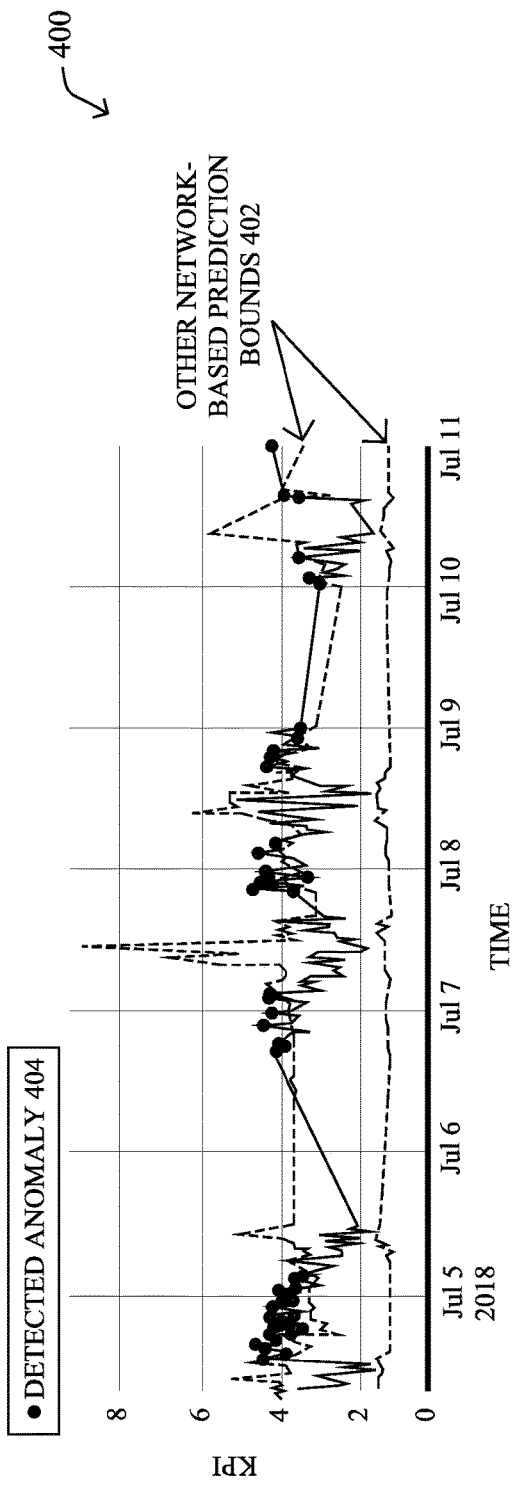
FIGS. 4A-4B illustrate example anomaly detection plots for different anomaly detectors.
Figure 4B:
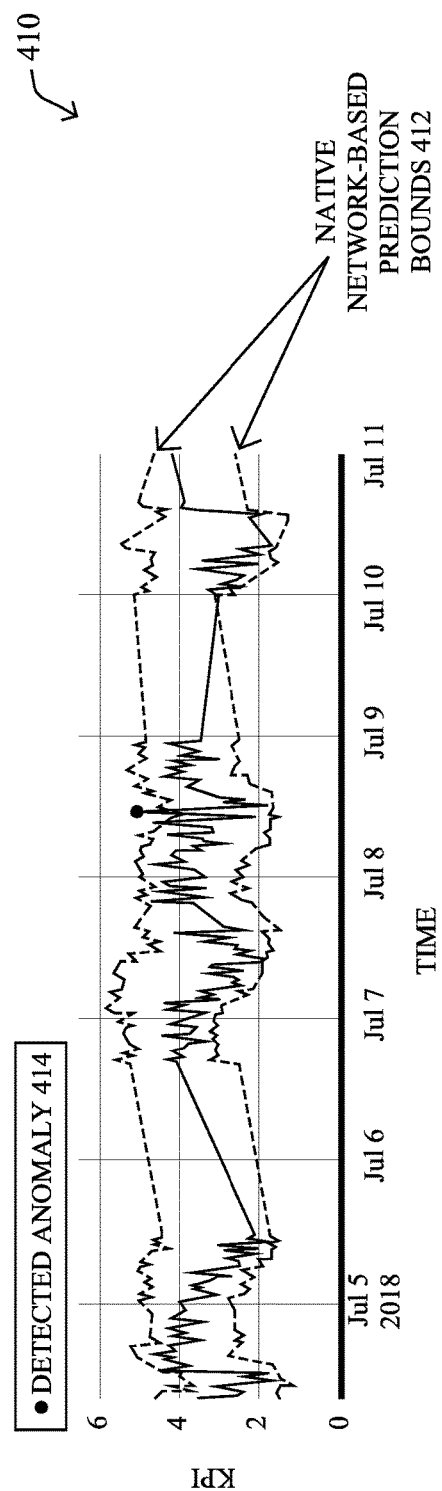

FIGS. 4A-4B illustrate example anomaly detection plots for different anomaly detectors, to demonstrate the challenges in applying an anomaly detector trained on one network to another network. In both of plots 400 and 410 in FIGS. 4A and 4B, respectively, the same key performance indicator (KPI) measurements of interest are plotted for a network under scrutiny. In plot 400 in FIG. 4A, an anomaly detector trained using telemetry data from another network was applied to the measured KPIs, resulting in quite a number of detected anomalies 404. More specifically, the anomaly detector trained using the telemetry data from the existing network may learn the upper and lower prediction bounds 402 that define what the expected/normal behavior for the KPI should be over time. If the actual KPI exceeds either of bounds 402, this indicates an abnormal behavior and, thus, is flagged as an anomaly 404.

Plot 410 in FIG. 4B again plots the same KPI over time as that of plot 400. However, in this example, the anomaly detector applied to the KPI was trained using telemetry data captured from the network under scrutiny (e.g., the network in which the KPI was observed over time). Similar to the anomaly detector of FIG. 4A, the anomaly detector applied in plot 410 may have upper and lower prediction bounds 412 that define what is considered to be 'normal' network behaviors over time. Here, only a single anomaly 414 is detected, in sharp contrast to the anomaly detector from plot 400 in FIG. 4A. Thus, it can be seen that poor detector performance (e.g., too many or too few raised anomalies, etc.) can result when applying an anomaly detector to another network on which it has not been trained.

One naïve approach to addressing the issue of training a network anomaly detector for a new network would be to simply defer applying anomaly detection to the new network until a suitable training dataset has been collected from that network. However, the amount of time needed to do so can vary by network and, in many cases, could span weeks, months, etc. This waiting time may be unfavorable to many potential users of the network assurance service and, in the meantime, allow issues in the network to go unnoticed.

Using a Multi-Network Dataset to Overcome Anomaly Detection Cold Starts

The techniques herein allow for the use of a cold start mode for anomaly detection when onboarding a new network to a network assurance service. In some aspects, during the cold start mode, the service may employ a similarity function to identify an existing anomaly detector that was trained on a dataset that is similar in behavior to that of the new network. When and if such a detector exists, the service can start applying the identified detector to telemetry data from the new network and raise anomaly alerts, accordingly. In further aspects, if the selected anomaly detector starts to diverge from its expected performance, the service may disable its use for the new network until enough target data is gathered from the new network for training its own anomaly detector with acceptable model accuracy.

Specifically, according to one or more embodiments of the disclosure as described in detail below, a network assurance service receives a first set of telemetry data captured in a first network monitored by the network assurance service. The network assurance service computes, for each of a plurality of other networks monitored by the service, a similarity score between the first set of telemetry data and a set of telemetry data captured in that other network. The service selects a machine learning-based anomaly detector trained using a particular one of the sets of telemetry data captured in one of the plurality of other networks, based on the computed similarity score between the first set of telemetry data and the particular set of telemetry data captured in one of the plurality of other networks. The service uses the selected anomaly detector to assess telemetry data from the first network, until the service has received a threshold amount of telemetry data for the first network.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 5:
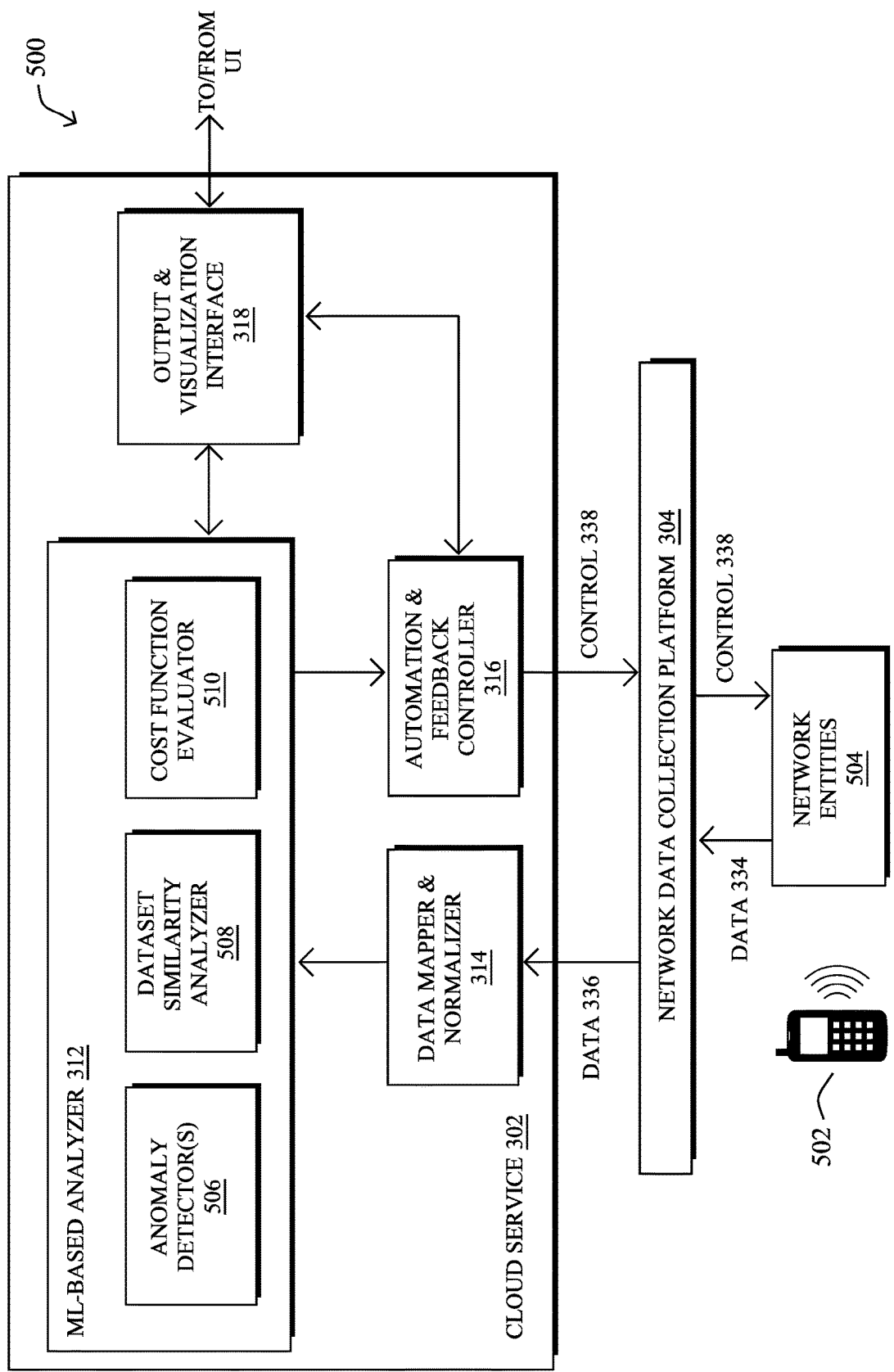
FIG. 5 illustrates an example architecture for using a multi-network dataset to overcome anomaly detector cold starts.

Operationally, FIG. 5 illustrates an example architecture 500 for using a multi-network dataset to overcome anomaly detector cold starts, according to various embodiments. At the core of architecture 400 may be the following components: one or more anomaly detectors 406, a dataset similarity analyzer 508, and/or a cost function evaluator 510. In some implementations, the components 506-510 of architecture 500 may be implemented within a network assurance system, such as system 300 shown in FIG. 3. Accordingly, the components 506-510 of architecture 500 shown may be implemented as part of cloud service 302 (e.g., as part of machine learning-based analyzer 312 and/or output and visualization interface 318), as part of network data collection platform 304, and/or on one or more network elements/ entities 504 that communicate with one or more client devices 502 within the monitored network itself. Further, these components 506-510 may be implemented in a distributed manner or implemented as its own stand-alone service, either as part of the local network under observation or as a remote service. In addition, the functionalities of the components of architecture 400 may be combined, omitted, or implemented as part of other processes, as desired.

During operation, service 302 may receive telemetry data from the monitored network (e.g., anonymized data 336 and/or data 334) and, in turn, assess the data using one or more anomaly detectors 506. At the core of each anomaly detector 506 may be a corresponding anomaly detection model, such as an unsupervised learning-based model. When an anomaly detector 506 detects a network anomaly, output and visualization interface 318 may send an anomaly detection alert to a user interface (UI) for review by a subject matter expert (SME), network administrator, or other user. Notably, an anomaly detector 506 may assess any number of different network behaviors captured by the telemetry data (e.g., number of wireless onboarding failures, onboarding times, DHCP failures, etc.) and, if the observed behavior differs from the modeled behavior by a threshold amount, the anomaly detector 506 may report the anomaly to the user interface via network anomaly, output and visualization interface 318.

According to various embodiments, architecture 500 may also include a dataset similarity analyzer 508 configured to evaluate the similarity of data 334/336 collected from the network under scrutiny to that of other networks monitored by service 302. In turn, based on the resulting similarity scores, analyzer 508 may select the most suitable anomaly detectors from among anomaly detectors 506 to assess data 334/336 from the new network.

In further embodiments, architecture 500 may also include a cost function evaluator 510 that is responsible for evaluating the "health" of the anomaly detector selected by dataset similarity analyzer 508 by way of a cost function. More specifically, the cost function/health score may indicate whether the anomaly detector selected to monitor the network was a good choice and, if not, analyzer 312 may disable the use of the selected anomaly detector 506 to analyze telemetry from the new network until further telemetry data is gathered from that network.

To illustrate the operations of dataset similarity analyzer 508 and cost function evaluator 510 in architecture 500, let $N_1, \ldots, N_n$ denote the networks that are already in the system and let $D_1, \ldots, D_n$ denote their respective datasets of time evolving network measurements/telemetry. For a new network $N_1$ that has not previously been monitored by service 302, or one for which its monitoring has ceased for some time, assume that it also has a corresponding (small) dataset $D_{n+1}$. In such a case, processing may proceed as follows, in some embodiments, so long as $D_{n+1}$ is too small to train a suitable anomaly detector 506 for the new network:

Dataset similarity analyzer 508 computes a similarity score $S_i=S(D_i, D_{n+1})$ for each existing network $N_i$. Here S is used to denote the similarity function (S: $D_i, D_j \varepsilon R$).

Next, dataset similarity analyzer 508 finds $N_j$, the network for which: $S_j$=argmin over $_i$ of: $S(D_i, D_{n+1})$, namely the existing network that is the most similar to network $N_{n+1}$, based on the similarity function S.

In turn, analyzer 312 then uses the anomaly detector 506 developed for $N_j$, using $D_j$ to detect anomalies for the new network $N_{n+1}$.

In the context of the teachings herein, the threshold amount of telemetry data from the new network in order to be considered suitably large for purposes of training an anomaly detector 506 specifically for the new network may be determined by cost function evaluator 510. Notably, a set of telemetry data from the new network may be sufficiently large for anomaly detector training, if an anomaly detector trained on this dataset has a health score above a defined threshold. Conversely, if the health score of the anomaly detector trained using telemetry data from the new network is below this threshold, meaning that the generated KPI estimates are off, the training dataset may be considered to be too small.

In some embodiments, for a pair of telemetry samples from two different networks, dataset similarity analyzer 508 may compute their similarity score as an estimate of the divergence between the two datasets using a discriminant binary classifier. More specifically let $D_1$ and $D_2$ be the sample telemetry datasets from the respective networks and let F be the binary discriminant classifier. In such a case, the problem of distinguishing between $D_1$ and $D_2$ can be recast as a binary classification problem. To do so, dataset similarity analyzer 508 may assign a label of '0' to the data in $D_1$ and a label of '1' to the data in $D_2$, thus resulting in a combined, labeled dataset $D_{12}$.

Once dataset similarity analyzer 508 has formed a labeled, merged dataset $D_{12}$ from the telemetry data from the two networks, analyzer 508 may apply classifier F to $D_{12}$. As would be appreciated, if the classifier is unable to correctly label a sample from $D_{12}$ with its assigned label (e.g., '0' or '1'), this means that the sample is similar in both networks. Thus, during execution, dataset similarity analyzer 508 may compute k-number of estimates of the accuracy of classifier F on $D_{12}$ using a k-fold cross-validation scheme or via any other accuracy measure.

In some embodiments, dataset similarity analyzer 508 can then compute the overall similarity score $S_F(D_1, D_2)$ as inversely proportional to the average accuracy of F across the k-folds. This means that for a given dataset $D_{n+1}$, the minimizer of $S_F(D_{n+1}, D_i)$ where $D_i$ ranges over the candidate datasets, is the dataset which is the most indistinguishable from $D_{n+1}$ according to F. Based on this, analyzer 312 can select the corresponding anomaly detector 506 trained using the most similar dataset to that of $D_{n+1}$ to begin analyzing telemetry data from the new network $N_{n+1}$.

In one approach, once the anomaly detector 506 developed for $N_j$ (using $D_j$ to detect anomalies for the new network $N_{n+1}$) has been selected, network anomalies may be raised using that classifier. At that point, service 302 may send an alert to a user interface associated with the monitored network via output and visualization interface 318. In addition, as the anomaly detector being used to assess the network was trained using data from another network, service 302 may also provide an indication to the user interface that service 302 is currently in a cold start mode and that service 302 is monitoring several KPIs related to the performance of the network. For example, such KPIs may be the number of anomalies being raised per use case (e.g. number of anomalies related to on-boarding times, global and per-application throughput) potentially normalized by the number of wireless user, etc.

In some embodiments, the performance of the anomaly detector 506 selected to assess telemetry data from the new network may be used to control whether the selected detector should remain active in cold start mode. For example, output and visualization interface 318 may obtain relevancy feedback via the user interface or from another automated system capable of assessing anomaly relevancy regarding a raised anomaly detection alert. Notably, while some network behaviors may be anomalous from a strictly statistical standpoint, the may nonetheless be benign behaviors.

If service 302 determines that the performance of the selected anomaly detector 506 falls below a defined threshold (e.g., percentage of "relevant" anomalies, number of anomalies raised exceeding the x*$99^{th}$ percentile of such anomalies raised in similar networks, etc., service 302 may dynamically disable the anomaly detector 506 from analyzing the target network and fall back to a mode where more telemetry data is collected from the network for training purposes. In such a case, service 302 may also send a notification to the user interface associated with the network, to notify the user that the cold start mode has been suspended.

In other embodiments, any dataset $D_i$ that achieves a sufficiently low accuracy $S_F(D_{n+1}, D_i)$ may be used to train the anomaly detection model. Furthermore, as $D_{n+1}$ grows, analyzer 312 may incorporate it into the training data of the selected anomaly detector 506 until the contribution of other dataset is no longer beneficial to the performance of the detector relative to the new network. At such a point, analyzer 412 may switch over to using only $D_{n+1}$ as the training dataset, thereby allowing the new network to have its own anomaly detector 506. During testing, this switchover was found to be anywhere between two weeks and two months, depending on the network.

Anomaly detection is in most cases an unsupervised task, in the sense that there is no, or very little ground truth information. As the name suggests, anomalies are data points that are outside of the normal distribution and as such are very infrequent. Thus it is a challenging task to evaluate an anomaly detection solution, let alone doing so automatically. In the context of detecting anomalies in a new network, however, service 302 may be forced to decide whether or not to use an anomaly detector 506 trained on a different network to assess the new network. To this end, cost function evaluator 510 may compute a cost function for the chosen detector that captures the visual characteristics of the selected detector on a given dataset, as well as the rate of anomalies. In other embodiments, this cost function can be easily extended with other component corresponding to different solution aspects.

To better illustrate the cost function computed by cost function evaluator 510, let $D=\{(X_i, y_i)\}$ denote a dataset of examples, $X_i$, and their corresponding KPI, $y_i$, and let $(y_i^u, y_i^l)$ denote the upper and lower bound for $y_i$ returned by the anomaly detector. Also, let Q=|D| denote the number of examples in the dataset. An anomaly is raised by the selected anomaly detector 506 when $y_i > y_i^u$, or when $y_i < y_i^l$. Thus, in some embodiments, cost function evaluator 510 may compute the cost function for $\{(X_i, y_i, y_i^u, y_i^l)\}$ as a weighted sum of any or all of the following:

Anomalies rate: $sum_i$ Indicator $(y_i > y_i^u$ or $y_i < y_i^l)/Q$

The average spread: $sum_i (y_i^u - y_i^l)/Q$

The average anomalies margin: $sum_i [\max (y_i - y_i^u, 0) + \max(y_i^l - y_i, 0)]/Q$ Based on the resulting cost function, analyzer 312 may determine that the cost is to too high (e.g., exceeds a predefined threshold) and disable the selected anomaly detector 506 from analyzing telemetry from the new network. For example, if the selected detector is raising anomaly alerts at a very high rate, this may indicate that the selected detector was a poor choice and can be disabled.

A prototype was constructed using the techniques herein, leveraging data collected from a set of networks $N_1$-$N_8$. For these datasets, the classification error based similarity function, $S_F(D_i, D_j)$, was used to find the most similar datasets for a test dataset. An average $S_F(D_i, D_j)$ score was computed using a set of ten logistic regression and tree based classifiers with different parameters. FIG. 6 illustrates a matrix 600 of the average and standard deviation score for each $D_i$, $D_j$ pair computed across the networks $N_1$-$N_8$. From FIG. 6, it can be seen that the average score for all $N_i$, $S_F(D_i, D_i)$ is 0.5. This is due to the fact that the classifiers can naturally not distinguish between random samples from the same distribution.

Figure 7A:
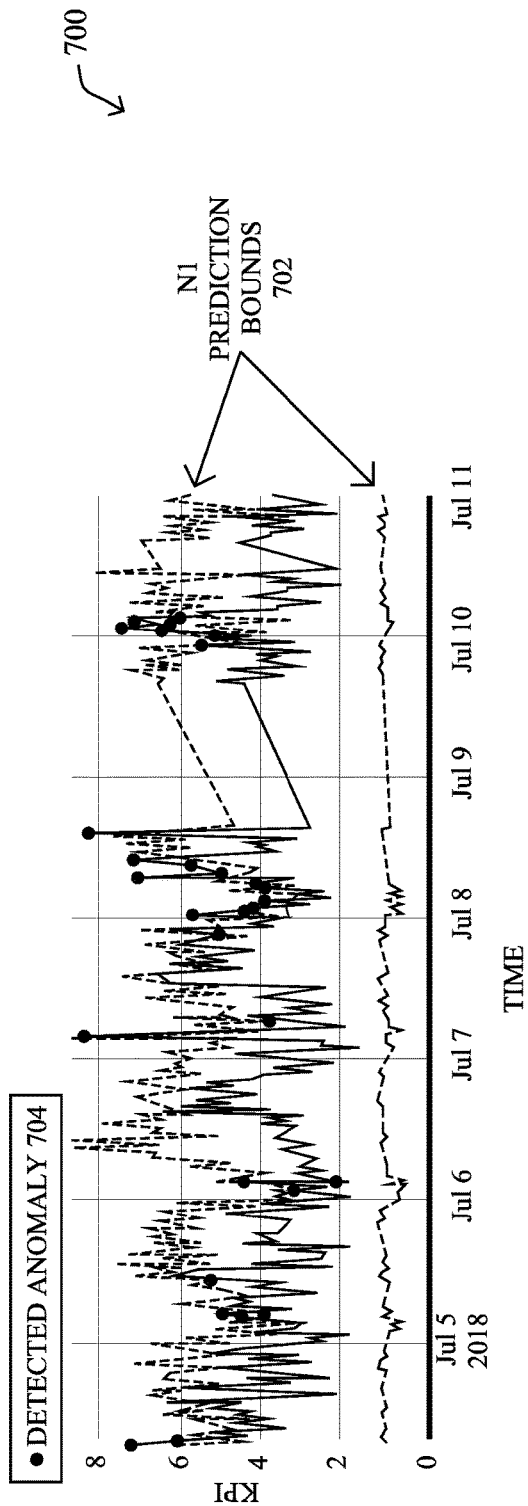
FIGS. 7A-7C illustrate example plots of KPI anomaly detection for different networks.
Figure 7B:
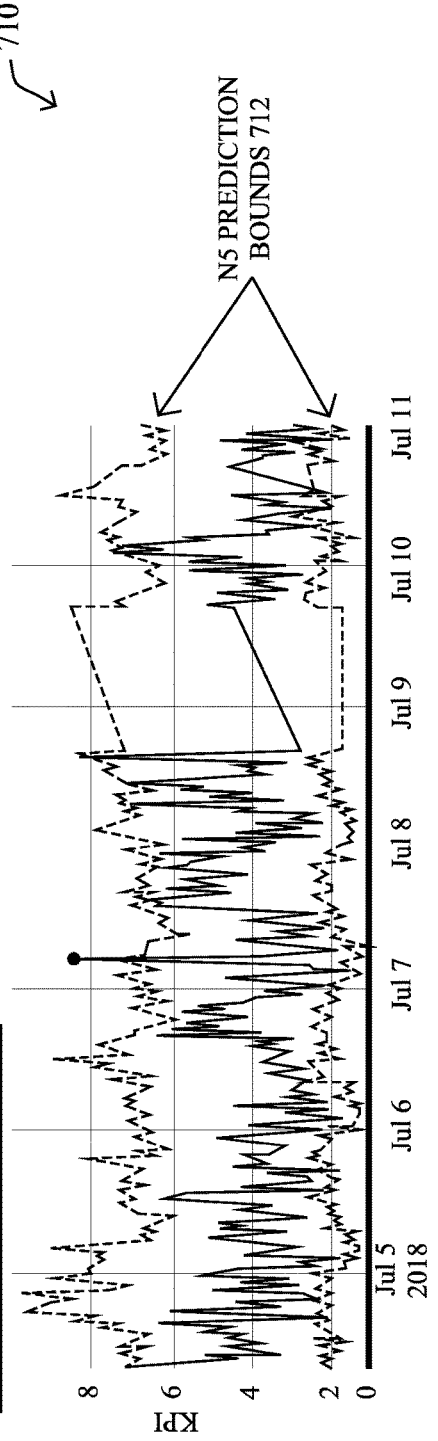
Figure 7C:
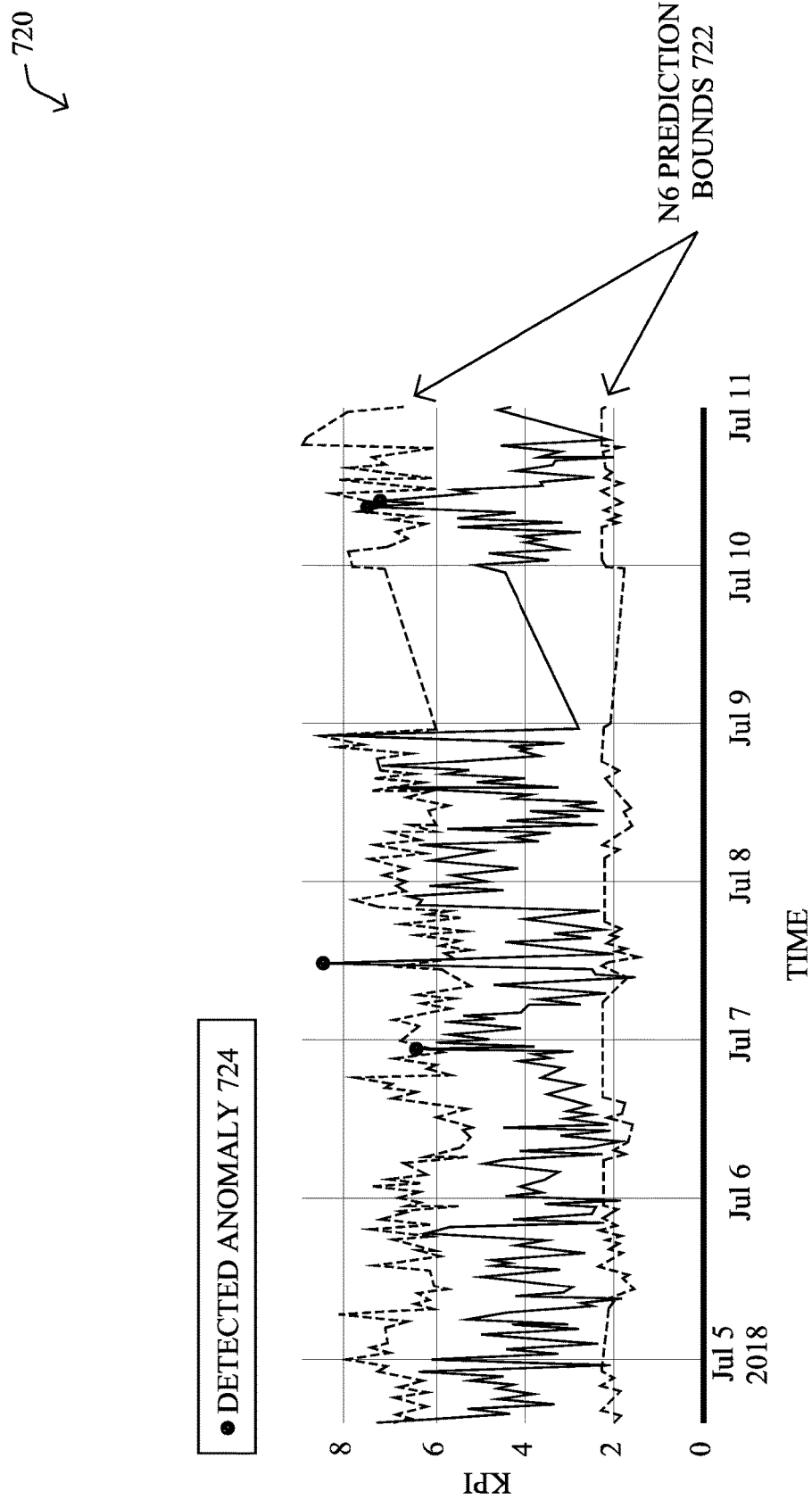

Using matrix 600, the most similar other network can also be determined for each $N_i$. For example, FIGS. 7A-7C illustrate plots 700, 710, and 720, respectively for a measured KPI of interest over time from network $N_6$. To illustrate the effects of dataset similarity on the accuracy of the anomaly detection model, anomaly detectors were trained using the telemetry data from networks $N_1$, $N_5$, and $N_6$, whose prediction bounds 702, 712, and 722 are shown in FIGS. 7A-7C, respectively. From this, it can be seen in FIG. 7A that the anomaly detector trained using $N_1$ data does not perform very well, raising a relatively large number of detected anomalies 704. In FIG. 7B, the anomaly detector trained on the data from network $N_5$ does better than the one trained on the data from $N_1$, but not as well as the one trained on $N_6$, as shown in FIG. 7C. This confirms the expectation based on the similarly score ranking for $N_6$ from matrix 600 in FIG. 6: $N_1$ with 0.95+/−0.02 and $N_5$ with 0.81+/−0.14.

Figure 8:
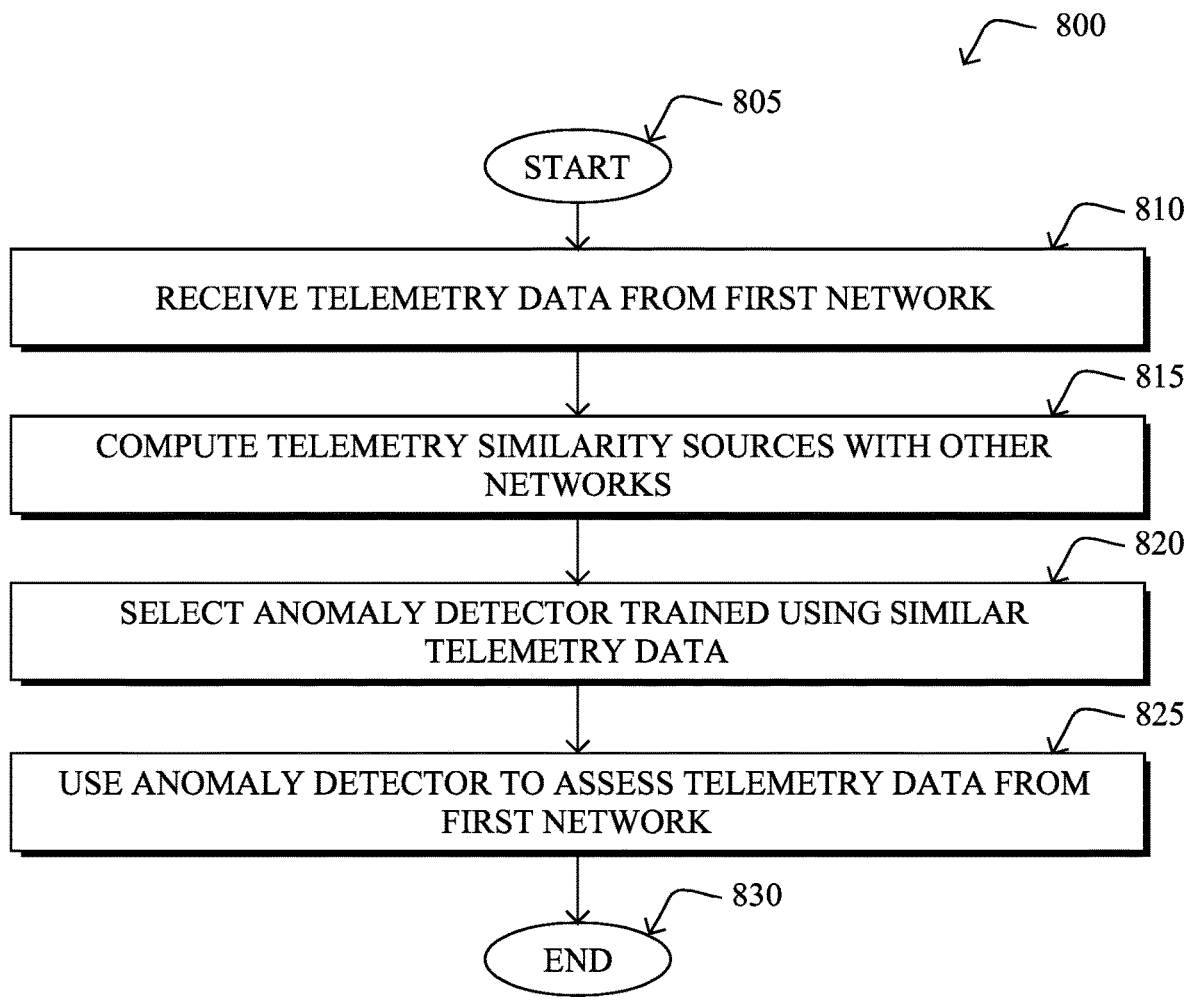
FIG. 8 illustrates an example simplified procedure for multi-network dataset to overcome anomaly detector cold starts.

FIG. 8 illustrates an example simplified procedure for <doing stuff> in a network in accordance with one or more embodiments described herein. For example, a non-generic, specifically configured device (e.g., device 200) may perform procedure 800 by executing stored instructions (e.g., process 248), to provide a network assurance service to any number of monitored networks. The procedure 800 may start at step 8405, and continues to step 810, where, as described in greater detail above, the network assurance service may receive a first set of telemetry data captured in a first network monitored by the network assurance service. In general, such telemetry data may include any number of measurements from the network such as, but not limited to, RSSI information, number of clients attached to a wireless AP, DHCP errors, onboarding failures, packet delays, drops, or jitter, or any other information indicative of the behavior of the network.

At step 815, as detailed above, the network assurance service may compute, for each of a plurality of other networks monitored by the network assurance service, a similarity score between the first set of telemetry data and a set of telemetry data captured in that other network. In some embodiments, the service may do so by applying binary labels to each of the datasets and then using a binary classifier on the labeled dataset. In turn, the service may compute the similarity score based on the accuracy of the classifier, such as the inverse of the classifier accuracy.

At step 820, the network assurance service may select a machine learning-based anomaly detector trained using a particular one of the sets of telemetry data captured in one of the plurality of other networks, as described in greater detail above. In various embodiments, the selection may be based on the computed similarity score between the first set of telemetry data and the particular set of telemetry data captured in one of the plurality of other networks. For example, the service may select the classifier trained using the dataset most similar to that of the network to be monitored by the network assurance service.

At step 825, as detailed above, the network assurance service may use the selected anomaly detector to assess telemetry data from the first network, until the network assurance service has received a threshold amount of telemetry data for the first network. In some embodiments, the service may determine whether such a threshold has been met by applying a cost function to the selected detector. For example, the service may continue to use telemetry data from the two networks to train the detector and assess the performance of the detector using the cost function. If the performance reaches an acceptable level, this may indicate that the service now has enough telemetry data for training purposes. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for a network assurance service to begin detecting network anomalies in a new network, without first requiring a lengthy data collection period during which training data is collected from the network.

While there have been shown and described illustrative embodiments that provide for using a multi-network dataset to overcome anomaly detection cold starts, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a network assurance service, a first set of telemetry data captured in a first network monitored by the network assurance service;
computing, by the network assurance service and for each of a plurality of other networks monitored by the network assurance service, a similarity score between the first set of telemetry data and a set of telemetry data captured in that other network, wherein computing includes:
forming a set of labeled telemetry data by labeling the telemetry data in the first set of telemetry data with a first binary label and the telemetry data in the set of telemetry data captured in the other network with a second binary label;
applying a binary discriminant classifier to the set of labeled telemetry data, and
computing the similarity score between the first set of telemetry data and the set of telemetry data from the other network based on an accuracy of the binary discriminant classifier applied to the set of labeled telemetry data;
selecting, by the network assurance service, a machine learning-based anomaly detector trained using a particular one of the sets of telemetry data captured in one of the plurality of other networks, based on the computed similarity score between the first set of telemetry data and the particular set of telemetry data captured in one of the plurality of other networks; and
using, by the network assurance service, the selected anomaly detector to assess telemetry data from the first network, until the network assurance service has received a threshold amount of telemetry data for the first network.

2. The method as in claim 1, further comprising:
providing, by the network assurance service and to a user interface associated with the first network, an indication that the service is in a cold start mode, based on the service using the selected anomaly detector to assess telemetry data from the first network.

3. The method as in claim 1, further comprising:
computing, by the network assurance service, a cost function associated with using the selected anomaly detector to assess telemetry data from the first network, wherein the cost function is based on one or more of: a rate of network anomalies in the first network detected by the anomaly detector, an average spread of the detected anomalies, or an average margin for the detected anomalies.

4. The method as in claim 3, further comprising:
training, by the network assurance service, the anomaly detector over time using telemetry data from both the first network and the other network; and
determining, by the network assurance service, that the network assurance service has received the threshold amount of telemetry data for the first network based on the cost function associated with the anomaly detector.

5. The method as in claim 1, further comprising:
receiving, at the network assurance service and via a user interface associated with the first network, relevancy feedback regarding one or more network anomalies in the first network detected by the anomaly detector; and
suspending, by the network assurance service, use of the selected anomaly detector to assess telemetry data from the first network, based on the relevancy feedback.

6. The method as in claim 1, wherein the machine learning-based anomaly detector comprises a machine learning model trained using unsupervised machine learning.

7. The method as in claim 1, wherein the anomaly detector is configured to detect wireless onboarding anomalies or network throughput anomalies.

8. An apparatus, comprising:
one or more network interfaces to communicate with a network;
a processor coupled to the network interfaces and configured to execute one or more processes; and
a memory configured to store a process executable by the processor, the process when executed configured to:
receive a first set of telemetry data captured in a first network monitored by the apparatus;
compute, for each of a plurality of other networks monitored by the apparatus, a similarity score between the first set of telemetry data and a set of telemetry data captured in that other network, wherein computing includes:
forming a set of labeled telemetry data by labeling the telemetry data in the first set of telemetry data with a first binary label and the telemetry data in the set of telemetry data captured in the other network with a second binary label;
applying a binary discriminant classifier to the set of labeled telemetry data, and
computing the similarity score between the first set of telemetry data and the set of telemetry data from the other network based on an accuracy of the binary discriminant classifier applied to the set of labeled telemetry data;
select a machine learning-based anomaly detector trained using a particular one of the sets of telemetry data captured in one of the plurality of other networks, based on the computed similarity score between the first set of telemetry data and the particular set of telemetry data captured in one of the plurality of other networks; and
use the selected anomaly detector to assess telemetry data from the first network, until the apparatus has received a threshold amount of telemetry data for the first network.

9. The apparatus as in claim 8, wherein the process when executed is further configured to:
provide, to a user interface associated with the first network, an indication that the apparatus is in a cold start mode, based on the apparatus using the selected anomaly detector to assess telemetry data from the first network.

10. The apparatus as in claim 8, wherein the process when executed is further configured to:
compute a cost function associated with using the selected anomaly detector to assess telemetry data from the first network, wherein the cost function is based on one or more of: a rate of network anomalies in the first network detected by the anomaly detector, an average spread of the detected anomalies, or an average margin for the detected anomalies.

11. The apparatus as in claim 10, wherein the process when executed is further configured to:
train the anomaly detector over time using telemetry data from both the first network and the other network; and
determine that the apparatus has received the threshold amount of telemetry data for the first network based on the cost function associated with the anomaly detector.

12. The apparatus as in claim 8, wherein the process when executed is further configured to:
- receive, via a user interface associated with the first network, relevancy feedback regarding one or more network anomalies in the first network detected by the anomaly detector; and
- suspend use of the selected anomaly detector to assess telemetry data from the first network, based on the relevancy feedback.

13. The apparatus as in claim 8, wherein the machine learning-based anomaly detector comprises a machine learning model trained using unsupervised machine learning.

14. The apparatus as in claim 8, wherein the anomaly detector is configured to detect wireless onboarding anomalies or network throughput anomalies.

15. A tangible, non-transitory, computer-readable medium storing program instructions that cause a network assurance service that monitors a plurality of networks to execute a process comprising:
- receiving, at the network assurance service, a first set of telemetry data captured in a first network monitored by the network assurance service;
- computing, by the network assurance service and for each of a plurality of other networks monitored by the network assurance service, a similarity score between the first set of telemetry data and a set of telemetry data captured in that other network, wherein computing includes:
    - forming a set of labeled telemetry data by labeling the telemetry data in the first set of telemetry data with a first binary label and the telemetry data in the set of telemetry data captured in the other network with a second binary label;
    - applying a binary discriminant classifier to the set of labeled telemetry data, and
    - computing the similarity score between the first set of telemetry data and the set of telemetry data from the other network based on an accuracy of the binary discriminant classifier applied to the set of labeled telemetry data;
- selecting, by the network assurance service, a machine learning-based anomaly detector trained using a particular one of the sets of telemetry data captured in one of the plurality of other networks, based on the computed similarity score between the first set of telemetry data and the particular set of telemetry data captured in one of the plurality of other networks; and
- using, by the network assurance service, the selected anomaly detector to assess telemetry data from the first network, until the network assurance service has received a threshold amount of telemetry data for the first network.

16. The computer-readable medium as in claim 15, wherein the process further comprises:
- providing, by the network assurance service and to a user interface associated with the first network, an indication that the service is in a cold start mode, based on the service using the selected anomaly detector to assess telemetry data from the first network.

17. The computer-readable medium as in claim 15, wherein the process further comprises:
- computing, by the network assurance service, a cost function associated with using the selected anomaly detector to assess telemetry data from the first network, wherein the cost function is based on one or more of: a rate of network anomalies in the first network detected by the anomaly detector, an average spread of the detected anomalies, or an average margin for the detected anomalies.

\* \* \* \* \*

UNITED STATES PATENT AND TRADEMARK OFFICE
CERTIFICATE OF CORRECTION

PATENT NO. : 10,749,768 B2
APPLICATION NO. : 16/178679
DATED : August 18, 2020
INVENTOR(S) : Sharon Shoshana Wulff et al.

Page 1 of 1

It is certified that error appears in the above-identified patent and that said Letters Patent is hereby corrected as shown below:

In the Specification

Column 7, Line 50, please amend as shown:
AP1 through nth access point, APn) through which endpoint Column 7, Line 65, please amend as shown:
AP1 through nth access point, APm) that provide connectiv- Signed and Sealed this
Fifteenth Day of December, 2020

Andrei Iancu
*Director of the United States Patent and Trademark Office*